United States Patent
Kihara et al.

(10) Patent No.: US 10,427,521 B2
(45) Date of Patent: Oct. 1, 2019

(54) ACCELERATION DEVICE

(71) Applicant: DENSO CORPORATION, Kariya, Aichi-pref. (JP)

(72) Inventors: Noriyasu Kihara, Kariya (JP); Haruhiko Suzuki, Kariya (JP); Takehiro Saito, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/748,701

(22) PCT Filed: Jul. 22, 2016

(86) PCT No.: PCT/JP2016/071513
§ 371 (c)(1),
(2) Date: Jan. 30, 2018

(87) PCT Pub. No.: WO2017/029941
PCT Pub. Date: Feb. 23, 2017

(65) Prior Publication Data
US 2019/0001817 A1    Jan. 3, 2019

(30) Foreign Application Priority Data
Aug. 14, 2015  (JP) ................. 2015-160053

(51) Int. Cl.
*B60K 26/02* (2006.01)
*G05G 25/04* (2006.01)
*G05G 1/44* (2008.04)

(52) U.S. Cl.
CPC ............. *B60K 26/02* (2013.01); *G05G 25/04* (2013.01); *G05G 1/44* (2013.01)

(58) Field of Classification Search
CPC ......... Y10T 74/20528; Y10T 74/20888; Y10T 74/20534; G05G 1/44; B60T 7/06; B60K 26/02
See application file for complete search history.

(56) References Cited

U.S. PATENT DOCUMENTS 8,925,418 B2 * 1/2015 Saito .................. G05G 1/44
74/513
9,457,660 B2 * 10/2016 Osawa ................ B60K 26/021
(Continued)

FOREIGN PATENT DOCUMENTS

| JP | 2013-147211 | | 8/2013 |
| JP | 2015-074302 | | 4/2015 |
| JP | 2015074302 A | * | 4/2015 |

*Primary Examiner* — Patrick Cicchino
(74) *Attorney, Agent, or Firm* — Nixon & Vanderhye P.C.

(57) ABSTRACT

An acceleration device includes: a support portion that has a communication passage, which communicates between a receiving space and an outside; a shaft that is rotatably supported by the support portion; a pedal boss portion that is located on a radially outer side of the shaft and is rotatable integrally with the shaft in the communication passage; a rotational angle sensor that is operable to sense a rotational angle of the shaft relative to the support portion; a pedal spring that urges rotation of the shaft in an accelerator closing direction; and a projection that is formed in a communication passage inner wall, which is an inner wall of the communication passage and is opposed to a boss portion outer wall of the pedal boss portion. The projection projects from the communication passage inner wall in a radially inward direction.

15 Claims, 12 Drawing Sheets

(56) References Cited

U.S. PATENT DOCUMENTS

| | | | |
|---|---|---|---|
| 2012/0060642 A1* | 3/2012 | Yamaguchi | B60T 7/06 74/560 |
| 2013/0087009 A1* | 4/2013 | Stewart | B60K 26/021 74/560 |
| 2013/0160600 A1* | 6/2013 | Saito | G05G 1/44 74/513 |
| 2013/0186228 A1 | 7/2013 | Saito et al. | |

* cited by examiner

ACCELERATION DEVICE

CROSS REFERENCE TO RELATED APPLICATION

This application is the U.S. national phase of International Application No. PCT/JP2016/071513 filed Jul. 22, 2016, which designated the U.S. and claims priority to Japanese Patent Application No. 2015-160053 filed on Aug. 14, 2015, the entire contents of each of which are hereby incorporated by reference.

TECHNICAL FIELD

The present disclosure relates to an acceleration device.

BACKGROUND ART

Previously, there is known an acceleration device that controls an acceleration state of a vehicle according to the amount of depression of a pedal by a driver of the vehicle. The acceleration device includes: the pedal, which is depressible by the driver; a shaft, which is rotatable according to a rotational angle of a pedal arm connected to the pedal; and a housing, which rotatably supports the shaft and is to be fixed to a body of the vehicle. A boss portion, which is connected to the pedal arm and is rotatable integrally with the shaft, is provided to an outer wall of the shaft located at a radially outer side of the shaft.

The boss portion is rotatably received in a communication passage, which communicates between an inside of the housing and an outside, and a gap is formed between an outer wall of the boss portion, which is located at a radially outer side of the boss portion, and an inner wall of the housing, which forms the communication passage. Thus, there is a possibility of that foreign objects, which are contained in the air passing through the gap, enter the inside of the housing. The foreign objects, which enter the inside of the housing, may have negative influences on, for example, rotation of the shaft. In view of the above disadvantage, for example, the patent literature 1 discloses an acceleration device, which has projections at both of the radially outer wall of the boss portion, which is located at the radially outer side of the boss portion, and the inner wall of the housing, which forms the communication passage.

However, in the acceleration device of the patent literature 1, since the projections are formed at both of the radially outer wall of the boss portion, which is located at the radially outer side of the boss portion, and the inner wall of the housing, which forms the communication passage, the foreign objects, which have entered into the inside of the housing, cannot be easily discharged to the outside through the gap. Therefore, the foreign objects tend to be accumulated in the inside of the housing, and thereby there is a possibility of causing negative influences on, for example, the rotation of the shaft.

CITATION LIST

Patent Literature

PATENT LITERATURE 1: JP2013-147211A (US2013/0186228A1)

SUMMARY OF INVENTION

The present disclosure is made in view of the above disadvantage, and it is an objective of the present disclosure to provide an acceleration device that is capable of reducing the amount of foreign objects accumulated in an inside of a support portion.

An acceleration device of the present disclosure includes: a support portion that has a communication passage, which communicates between an inside of the support portion and an outside of the support portion, wherein the support portion is installable to a vehicle body; a shaft that is rotatably supported by the support portion; a boss portion that is located on a radially outer side of the shaft and is rotatable integrally with the shaft in the communication passage; a depressible portion that is connected to the boss portion and is depressible by a driver; a rotational angle sensing device that is operable to sense a rotational angle of the shaft relative to the support portion; an urging portion that urges rotation of the shaft in an accelerator closing direction; and a projection.

The projection is formed at only one of: a boss portion outer wall, which is located at a radially outer side of the boss portion; or a communication passage inner wall, which is an inner wall of the support portion that forms the communication passage and is opposed to the boss portion outer wall, wherein the projection projections from the boss portion outer wall in a radially outward direction or projects from the communication passage inner wall in a radially inward direction.

In the acceleration device of the present disclosure, the projection is formed to project from the boss portion outer wall in the radially outward direction or to project from the communication passage inner wall in the radially inward direction. Thereby, a size of a gap relative to a flow of the air entering from the outside changes between a region, at which the projection is formed, and a region, at which the projection is absent. Thus, the flow of the air is likely to be disturbed. When the flow of the air entering from the outside is disturbed, foreign objects, which are included in the air of the outside, are less likely to enter the inside of the support portion.

Since the projection is formed at only one of the boss portion outer wall or the communication passage inner wall, the foreign objects, which have entered the inside of the support portion, are discharged to the outside of the support portion along the other one of the communication passage inner wall or the boss portion outer wall, at which the projection is not formed. Thereby, the foreign objects, which have entered the inside of the support portion, can be easily discharged to the outside.

As discussed above, in the acceleration device of the present disclosure, the flow of the air from the outside is disturbed by the projection formed at only one of the boss portion outer wall or the communication passage inner wall, so that the amount of foreign objects entering the inside of the support portion can be reduced, while the foreign objects, which have entered the inside of the support portion, can be easily discharged to the outside along the other one of the communication passage inner wall or the boss portion outer wall, at which the projection is not formed. In this way, the amount of the foreign objects accumulated in the inside of the support portion can be reduced.

DESCRIPTION OF EMBODIMENTS

Figure 1:
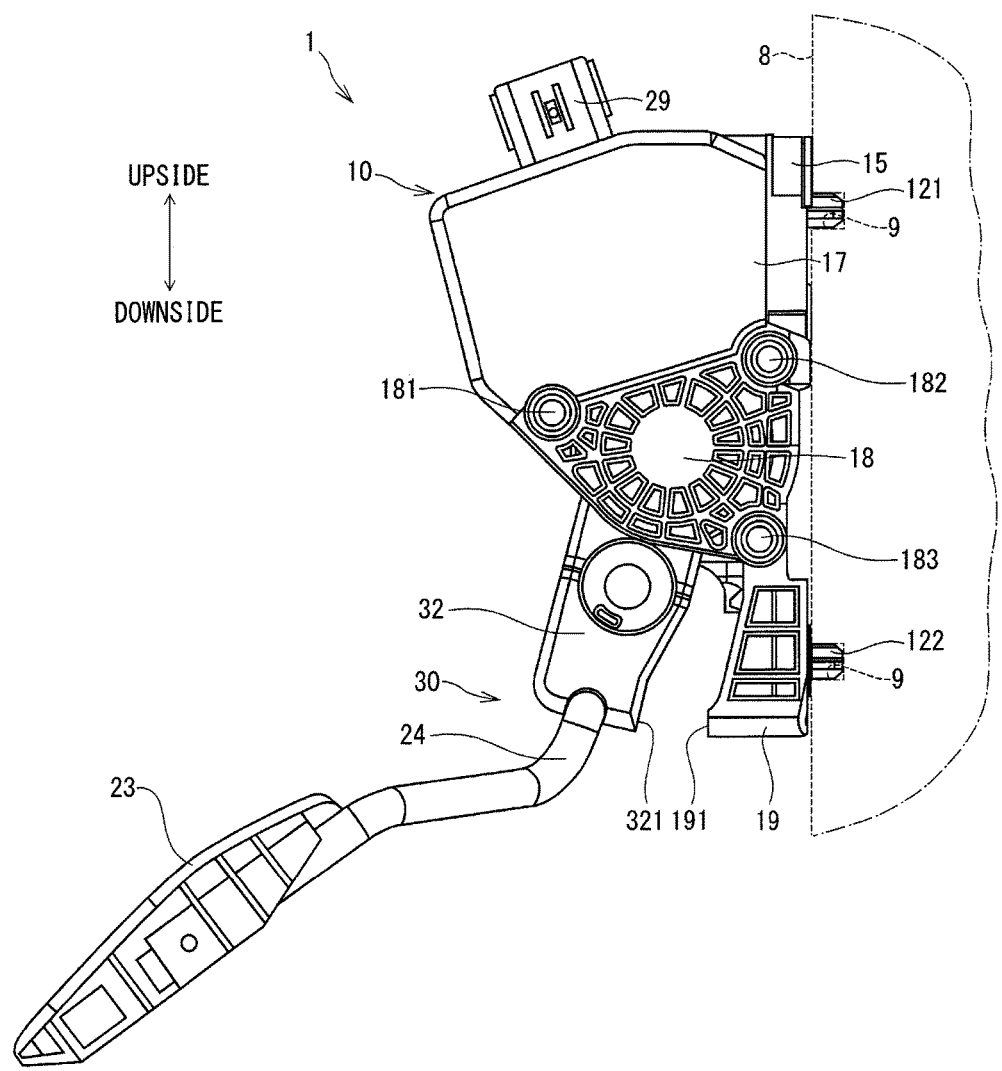
FIG. 1 is a schematic diagram of an acceleration device according to a first embodiment of the present disclosure.

Hereinafter, various embodiments of the present disclosure will be described with reference to the accompanying drawings.

First Embodiment

An acceleration device according to a first embodiment of the present disclosure will be described with reference to FIGS. 1 to 5. The acceleration device 1 of the first embodiment is an input device that is operated by a driver of a vehicle to determine a valve opening degree of a throttle valve of a vehicle engine (not shown).

The acceleration device 1 includes a support portion 10, a shaft 20, an operating portion 30, a pedal spring (serving as an urging portion) 300, a rotational angle sensor (serving as a rotational angle sensing device) 25, and a hysteresis mechanism 35. Hereinafter, an upper side of FIGS. 1 to 5 will be described as an upside, and a lower side of FIGS. 1 to 5 will be described as a downside. However, the upside-to-downside direction of the acceleration device 1 should not be limited to this direction.

The support portion 10 includes a housing 12, a first cover 17 and a second cover 18. The support portion 10 forms a receiving space (serving as an inside of the support portion) 110, which receives the shaft 20, the pedal spring 300, the rotational angle sensor 25 and the hysteresis mechanism 35. The support portion 10 includes a communication passage 500 at the downside of the support portion 10. The communication passage 500 communicates between the receiving space 110 and an outside of the support portion 10.

The housing 12 includes: a bearing portion 13, which rotatably supports one end portion 201 of the shaft 20; a front portion 14, which is connected to the bearing portion 13 and is located at a front side of the acceleration device 1; a back portion 15, which is opposed to the front portion 14; and a top portion 16, which is placed at the upside of the acceleration device 1 and connects the bearing portion 13 to the front portion 14 and the back portion 15.

Figure 3:
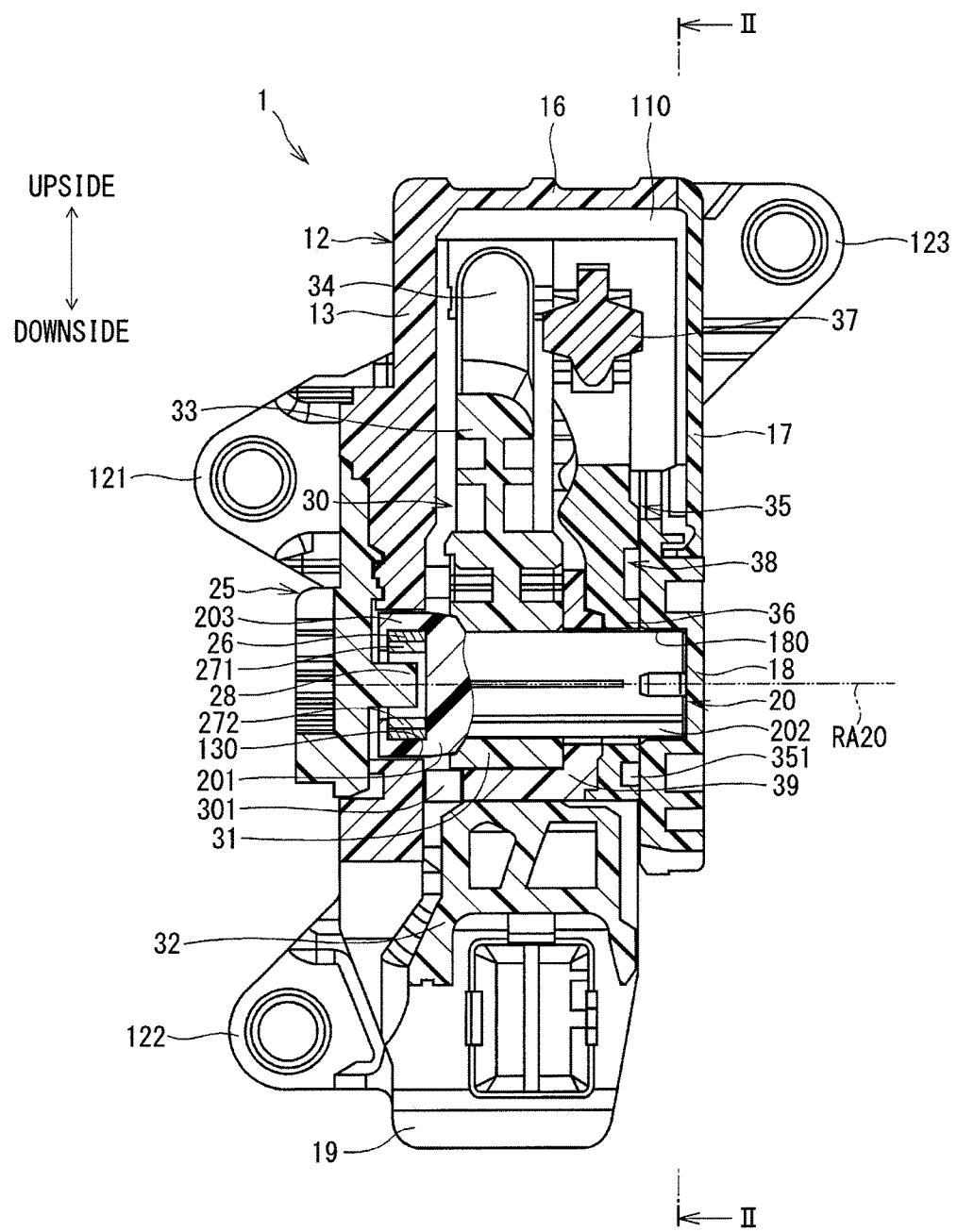
FIG. 3 is a cross sectional view taken along line in FIG. 2.
Figure 4:
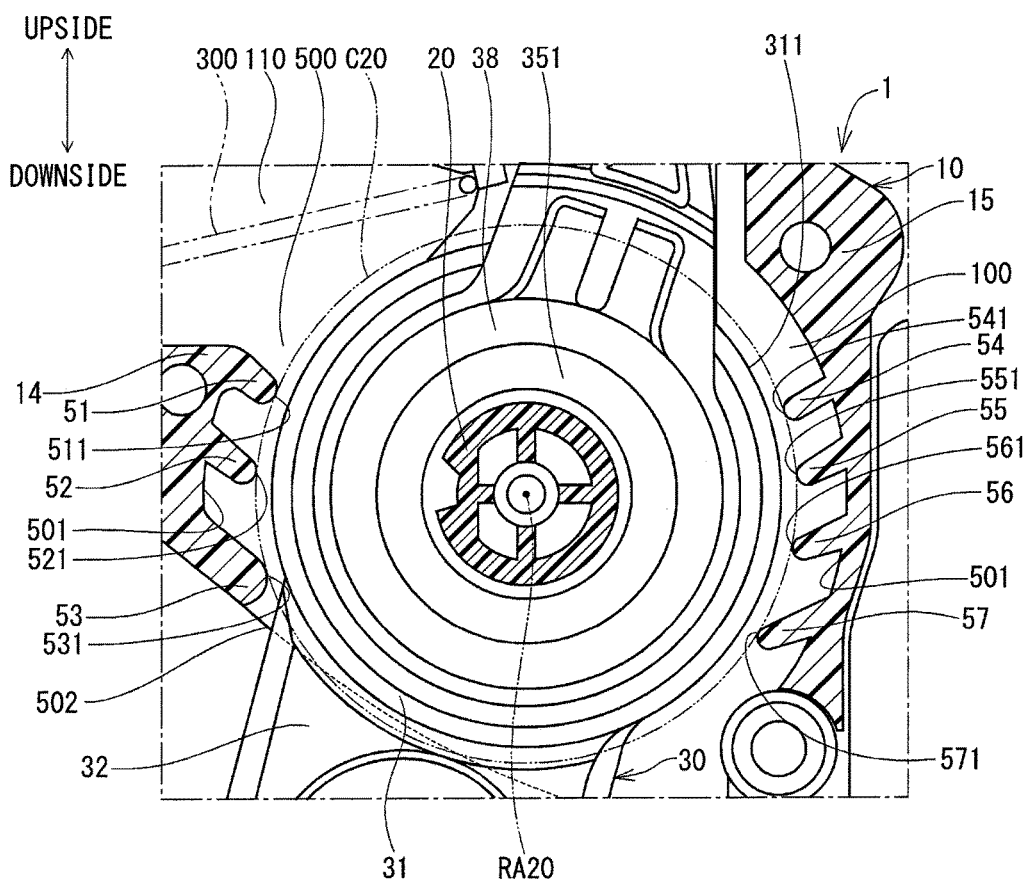
FIG. 4 is an enlarged view of a portion IV of FIG. 2.

As shown in FIG. 3, a plurality of mounting portions 121, 122, 123 is formed at the housing 12. The mounting portions 121, 122, 123 project from the back portion 15 to the outside of the housing 12. The mounting portions 121, 122, 123 are respectively fitted into fitting holes 9 of the vehicle body 8. In this way, the acceleration device 1 is installed to the vehicle body 8.

The bearing portion 13 includes a recess, which receives the one end portion 201 of the shaft 20. That is, an inner wall of the recess forms a bearing 130 that rotatably supports the one end portion 201 of the shaft 20.

A full opening stopper 19 is provided at the downside of the back portion 15. The full opening stopper 19 limits rotation of a member, which is rotated integrally with the operating portion 30 and the operating portion 30, at an accelerator full opening position when the full opening stopper 19 contacts the operating portion 30. The accelerator full opening position is a position that is set such that a degree of depression of the operating portion 30 by the driver, i.e., an accelerator opening degree becomes 100% at this position.

The first cover 17 and the second cover 18 are placed at a location that is opposed to and is parallel to the bearing portion 13.

The first cover 17 is engaged to the second cover 18 such that the first cover 17 contacts an opposite end part of the front portion 14, an opposite end part of the back portion 15 and an opposite end part of the top portion 16, which are opposite from the bearing portion 13. The first cover 17 limits intrusion of foreign objects into the receiving space 110.

The second cover 18 is fixed to the opposite end part of the back portion 15 and the opposite end part of the front portion 14, which are opposite from the bearing portion 13, with bolts 181, 182, 183. The second cover 18 includes a recess that receives the other end portion 202 of the shaft 20. That is, an inner wall of this recess forms a bearing 180 that rotatably supports the other end portion 202 of the shaft 20. Web-shaped ridges are formed at an outer wall of the second cover 18. The second cover 18 limits intrusion of foreign objects into the receiving space 110.

The shaft 20 is placed horizontally in the receiving space 110. A sensor receiving recess 203, which receives a sensing device of the rotational angle sensor 25, is formed at the one end portion 201 of the shaft 20.

The shaft 20 rotates within a predetermined angular range from an accelerator full closing position to an accelerator full opening position in response to a torque inputted from the operating portion 30 through the depressing operation of the operating portion 30 by the driver. The accelerator full closing position is a position that is set such that the degree of depression of the operating portion 30 by the driver, i.e., the accelerator opening degree becomes 0% at this position.

Figure 2:
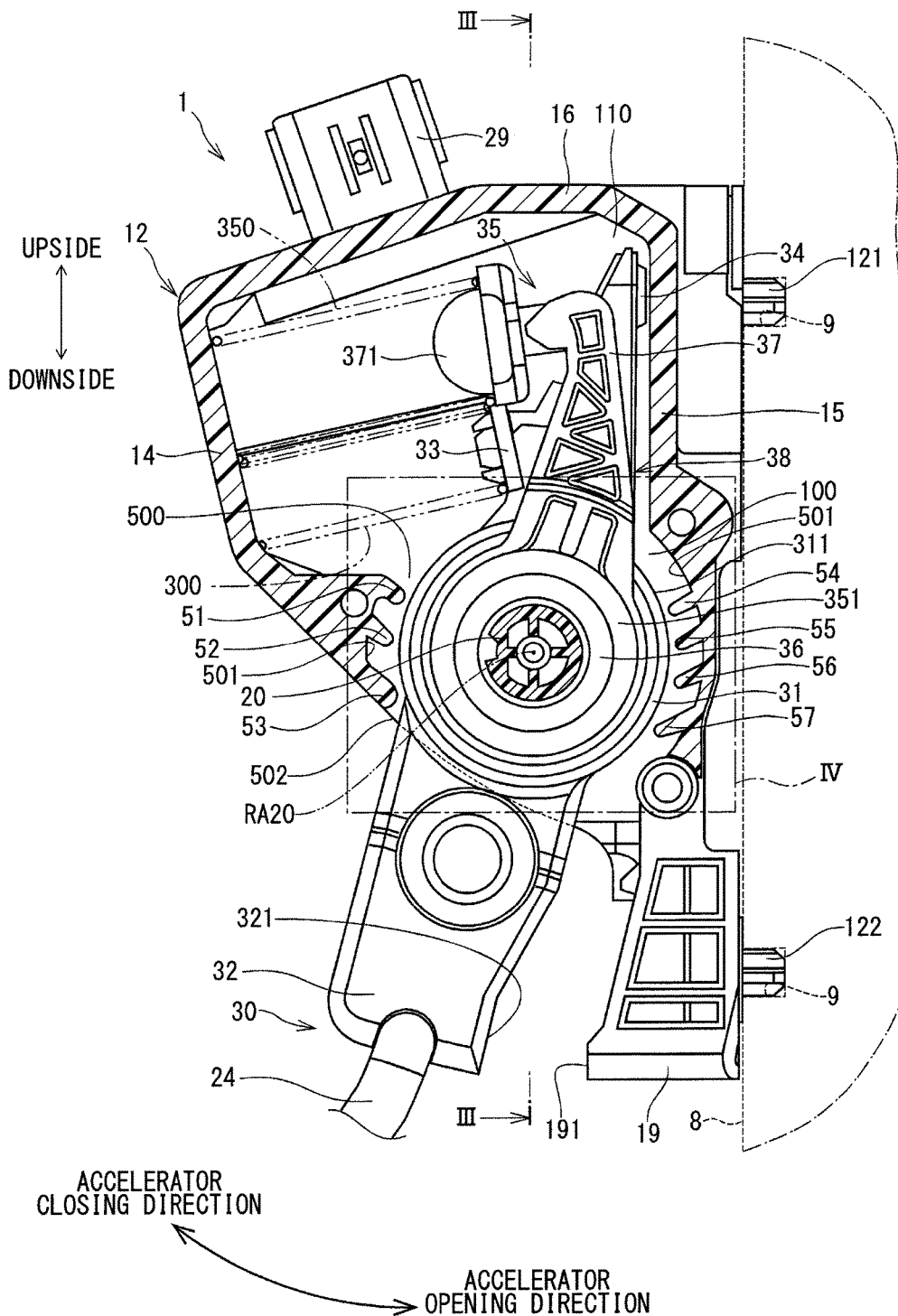
FIG. 2 is a cross sectional view of the acceleration device according to the first embodiment of the present disclosure.

Hereinafter, as shown in FIG. 2, a rotational direction of the operating portion 30 from the accelerator full closing position toward the accelerator full opening position will be referred to as an accelerator opening direction. Furthermore, a rotational direction of the operating portion 30 from the accelerator full opening position toward the accelerator full closing position will be referred to as an accelerator closing direction.

The operating portion 30 includes an accelerator pedal (serving as a depressible portion) 23, a pedal arm 24, a pedal boss portion (serving as a boss portion) 31, an arm connecting portion 32, a pedal spring receiving portion 33 and a full closing stopper 34. The pedal boss portion 31, the arm connecting portion 32, the pedal spring receiving portion 33 and the full closing stopper 34 are integrally formed in one piece from resin.

The accelerator pedal 23 is formed at one end part of the pedal arm 24. The other end part of the pedal arm 24 is fixed to an end part of the arm connecting portion 32. The accelerator pedal 23 converts the depressing of the accelerator pedal 23 by the driver into a rotational torque exerted about a rotational axis RA20 of the shaft 20 and transmits the rotational torque to the shaft 20.

When the accelerator pedal 23 is rotated in the accelerator opening direction, a rotational angle of the shaft 20 in the accelerator opening direction from the accelerator full closing position, which serves as a reference point, is increased, and thereby the accelerator opening degree, which corresponds to this rotational angle, is increased.

Furthermore, when the accelerator pedal 23 is rotated in the accelerator closing direction, the rotational angle of the shaft 20 is decreased, and thereby the accelerator opening degree is decreased.

The pedal boss portion 31 is shaped into a tubular form. The pedal boss portion 31 is formed between the bearing portion 13 and the second cover 18 and is fixed to a radially outer wall of the shaft 20 located at a radially outer side of the shaft 20, by, for example, press fitting. The pedal boss portion 31 is rotatably received in the communication passage 500. Therefore, a gap 100 is formed between a boss portion outer wall 311 of the pedal boss portion 31, which is located at the radially outer side of the pedal boss portion 31, and a communication passage inner wall 501 of the support portion 10, which forms the communication passage 500.

Primary bevel gear teeth (not shown) are formed at a side surface of the pedal boss portion 31, which is located on the second cover 18 side. The primary bevel gear teeth are arranged one after another at equal intervals in a circumferential direction.

An amount of projection of each primary bevel gear tooth toward the hysteresis rotatable member 38 of the hysteresis mechanism 35 is progressively increased in the accelerator closing direction in the circumferential direction, and a tilt surface is formed at a distal end part of the primary bevel gear tooth such that the tilt surface progressively gets closer to the hysteresis rotatable member 38 in the accelerator closing direction.

A first friction member 301 is formed at a side surface of the pedal boss portion 31, which is located on the bearing portion 13 side. The first friction member 301 is shaped into a ring form and is placed on the radially outer side of the shaft 20 at a location between the pedal boss portion 31 and an inner wall of the bearing portion 13. When the pedal boss portion 31 is urged in a direction away from the hysteresis rotatable member 38, i.e., in a direction toward the bearing portion 13, the pedal boss portion 31 is frictionally engaged to the first friction member 301. A frictional force between the pedal boss portion 31 and the first friction member 301 becomes a rotational resistance against the rotation of the pedal boss portion 31.

The arm connecting portion 32 is placed on the radially outer side of the pedal boss portion 31. The arm connecting portion 32 extends from the pedal boss portion 31 in the downside direction. An end part of the arm connecting portion 32, which is located on downside, is connected to the other end part of the pedal arm 24. An end surface 321 of the arm connecting portion 32, which faces the accelerator opening direction, is contactable with a contact surface 191 of the full opening stopper 19.

The pedal spring receiving portion 33 is placed on the radially outer side of the pedal boss portion 31. The pedal spring receiving portion 33 is formed to extend from the pedal boss portion 31 in the upside direction in the receiving space 110. One end part of the pedal spring 300 is engaged to the pedal spring receiving portion 33.

The pedal spring 300 is, for example, a coil spring. The other end part of the pedal spring 300 contacts an inner wall of the front portion 14. The pedal spring 300 urges the operating portion 30 in the accelerator closing direction. An urging force of the pedal spring 300, which is applied to the operating portion 30, is increased when the rotational angle of the operating portion 30, i.e., the rotational angle of the shaft 20 is increased. Furthermore, this urging force is set such that the operating portion 30 and the shaft 20 can be returned to the accelerator full closing position regardless of the rotational angle of the operating portion 30.

The full closing stopper 34 is formed such that the full closing stopper 34 further extends in the upside direction from the pedal spring receiving portion 33 in the receiving space 110. The full closing stopper 34 limits rotation of the operating portion 30 in the accelerator closing direction when the full closing stopper 34 contacts an inner wall of the back portion 15.

The rotational angle sensor 25 includes a yoke 26, a pair of magnets 271, 272 respectively having different magnetic poles, and a Hall element 28. The yoke 26 is made of a magnetic material and is shaped into a tubular form. The yoke 26 is fixed to an inner wall of the sensor receiving recess 203 of the shaft 20. The magnets 271, 272 are placed on a radially inner side of the yoke 26 and are opposed to each other about the rotational axis RA20 of the shaft 20, and the magnets 271, 272 are fixed to an inner wall of the yoke 26. The Hall element 28 is placed between the magnet 271 and the magnet 272.

In a state where the electric current flows through the Hall element 28, when a magnetic field is applied to the Hall element 28, a voltage is generated at the Hall element 28. A density of a magnetic flux, which penetrates through the Hall element 28, changes when the magnets 271, 272 are rotated together with the shaft 20 about the rotational axis RA20 of the shaft 20. The amount of voltage generated is proportional to the density of the magnetic flux, which penetrates through the Hall element 28. The rotational angle sensor 25 senses the voltage, which is generated at the Hall element 28, and the rotational angle sensor 25 senses a relative rotational angle between the Hall element 28 and the magnets 271, 272, i.e., the rotational angle of the shaft 20 relative to the support portion 10. The rotational angle sensor 25 transmits an electric signal, which indicates the sensed rotational angle, to an external electronic control device (not shown) through an external connector 29 that is formed at a top of the acceleration device 1.

The hysteresis mechanism 35 includes: a hysteresis rotatable member 38, in which a hysteresis boss portion 36 and a hysteresis spring receiving portion 37 are formed integrally; an intermediate member 39; a second friction member 351; and a hysteresis spring 350.

The hysteresis boss portion 36 is placed on the radially outer side of the shaft 20 at a location between the pedal boss portion 31 and the inner wall of the second cover 18. The hysteresis boss portion 36 is shaped into a ring form and is rotatable relative to the shaft 20 and the pedal boss portion 31, and the hysteresis boss portion 36 can move toward or away from the pedal boss portion 31.

The hysteresis spring receiving portion 37 extends in the upside direction from the hysteresis boss portion 36 in the receiving space 110. The hysteresis spring receiving portion 37 includes an engaging portion 371, to which one end part of the hysteresis spring 350 is engaged, at an opposite end part of the hysteresis spring receiving portion 37, which is opposite from a side of the hysteresis spring receiving portion 37 connected to the hysteresis boss portion 36.

The intermediate member 39 is placed between the hysteresis boss portion 36 and the pedal boss portion 31. The intermediate member 39 is rotatable integrally with the hysteresis rotatable member 38 relative to the shaft 20 and the pedal boss portion 31, and the intermediate member 39 is movable toward or away from the pedal boss portion 31.

Secondary bevel gear teeth (not shown) are formed at a side surface of the intermediate member 39, which is located on the pedal boss portion 31 side. The secondary bevel gear teeth are arranged one after another at equal intervals in the circumferential direction. The amount of projection of each secondary bevel gear tooth toward the pedal boss portion 31 side is progressively increased in the accelerator opening direction in the circumferential direction, and a tilt surface is formed at a distal end part of the secondary bevel gear tooth such that the tilt surface progressively gets closer to the hysteresis boss portion 36 in the accelerator opening direction.

The rotation can be conducted from the pedal boss portion 31 to the intermediate member 39 and the hysteresis boss portion 36 and vice versa through contact between the tilt surface of each primary bevel gear tooth and the tilt surface of the corresponding adjacent secondary bevel gear tooth in the circumferential direction. Specifically, the rotation of the pedal boss portion 31 in the accelerator opening direction can be conducted to the hysteresis boss portion 36 through the primary bevel gear teeth and the secondary bevel gear teeth. Also, the rotation of the hysteresis boss portion 36 in the accelerator closing direction can be conducted to the pedal boss portion 31 through the secondary bevel gear teeth and the primary bevel gear teeth.

In the state where the rotational angle of the pedal boss portion 31 is on the accelerator full opening position side of the accelerator full closing position, the tilt surfaces of the primary bevel gear teeth and the tilt surfaces of the secondary bevel gear teeth are engaged with each other to space the intermediate member 39 and the hysteresis boss portion 36 away from the pedal boss portion 31. At this time, the primary bevel gear teeth urge the pedal boss portion 31 toward the bearing portion 13 side with an increasing force that is increased when the rotational angle of the pedal boss portion 31 is increased from the accelerator full closing position. Furthermore, the secondary bevel gear teeth urge the hysteresis boss portion 36 toward the second cover 18 side with an increasing force that is increased when the rotational angle of the pedal boss portion 31 is increased from the accelerator full closing position.

The second friction member 351 is shaped into a ring form and is placed on the radially outer side of the shaft 20 at a location between the hysteresis rotatable member 38 and the inner wall of the second cover 18. When the hysteresis rotatable member 38 is urged in a direction away from the pedal boss portion 31, i.e., in a direction toward the second cover 18, the hysteresis rotatable member 38 is frictionally engaged to the second friction member 351. A frictional force between the hysteresis rotatable member 38 and the second friction member 351 becomes a rotational resistance against the rotation of the hysteresis rotatable member 38.

The hysteresis spring 350 is, for example, a coil spring. The other end part of the hysteresis spring 350 contacts the inner wall of the front portion 14. The hysteresis spring 350 urges the hysteresis rotatable member 38 in the accelerator closing direction. An urging force of the hysteresis spring 350 is increased when the rotational angle of the hysteresis boss portion 36 is increased. A torque, which is applied to the hysteresis boss portion 36 through the urging of the hysteresis spring 350, is conducted to the pedal boss portion 31 through the secondary bevel gear teeth and the primary bevel gear teeth.

The acceleration device 1 of the first embodiment is characterized by a plurality of projections formed at the communication passage inner wall 501. Here, shapes of the projections will be described with reference to FIG. 4.

In the first embodiment, seven projections 51, 52, 53, 54, 55, 56, 57 are formed at the communication passage inner wall 501.

Among the seven projections 51, 52, 53, 54, 55, 56, 57, the projections 51, 52, 53 are formed at the communication passage inner wall 501 of the front portion 14. The projections 51, 52, 53 are formed such that a certain amount of gap is formed between each adjacent two of the projections 51, 52, 53. The projections 51, 52, 53 extend in the radially inward direction and project from the communication passage inner wall 501 toward an outside opening 502 of the communication passage 500.

Among the seven projections 51, 52, 53, 54, 55, 56, 57, the projections 54, 55, 56, 57 are formed at the communication passage inner wall 501 of the back portion 15. The projections 54, 55, 56, 57 are formed such that a certain amount of gap is formed between each adjacent two of the projections 54, 55, 56, 57. The projections 54, 55, 56, 57 extend in the radially inward direction and project from the communication passage inner wall 501 toward the outside opening 502 of the communication passage 500.

A radially inner end surface 511, 521, 531, 541, 551, 561, 571 of each of the projections 51, 52, 53, 54, 55, 56, 57 is placed along an imaginary circle C20 that is centered at a point along the rotational axis RA20. That is, the projections 51, 52, 53, 54, 55, 56, 57 are formed such that distances from the radially inner end surfaces 511, 521, 531, 541, 551, 561, 571 of the projections 51, 52, 53, 54, 55, 56, 57 to the boss portion outer wall 311 of the pedal boss portion 31, which is located at the radially outer side of the pedal boss portion 31, are equal to each other.

Next, the operation of the acceleration device 1 will be described.

When the accelerator pedal 23 is depressed by the driver, the operating portion 30 is rotated together with the shaft 20 about the rotational axis RA20 of the shaft 20 in the accelerator opening direction in response to the pedal force applied to the accelerator pedal 23. At this time, it is required to have the pedal force that generates a torque, which is larger than a sum of a torque generated by the urging forces of the pedal spring 300 and the hysteresis spring 350 and a resistance torque generated by the frictional forces of the first friction member 301 and the second friction member 351.

For example, in order to maintain the current depression of the accelerator pedal 23 after the depressing of the accelerator pedal 23 by the driver, the driver may apply a pedal force that generates a torque larger than a difference between the torque generated by the urging forces of the pedal spring 300 and the hysteresis spring 350 and the resistance torque generated by the frictional forces of the first friction member 301 and the second friction member 351. Specifically, the driver can maintain the depression of the accelerator pedal 23 even when the pedal force is reduced to some extent after the depressing of the accelerator pedal 23.

Furthermore, in order to return the accelerator pedal 23 to the accelerator full closing position, the driver may apply a pedal force that generates a torque smaller than the difference between the torque generated by the urging forces of the pedal spring 300 and the hysteresis spring 350 and the resistance torque generated by the frictional forces of the first friction member 301 and the second friction member 351. Here, in the case of rapidly returning the accelerator pedal 23 to the accelerator full closing position, the driver may stop the depressing of the accelerator pedal 23. Therefore, there is no burden on the driver. In contrast, in the case of gradually returning the accelerator pedal 23, it is required to maintain application of a predetermined pedal force. At this time, the required pedal force, which is required at the time of gradually returning the accelerator pedal 23, becomes a relative small value.

Figure 5:
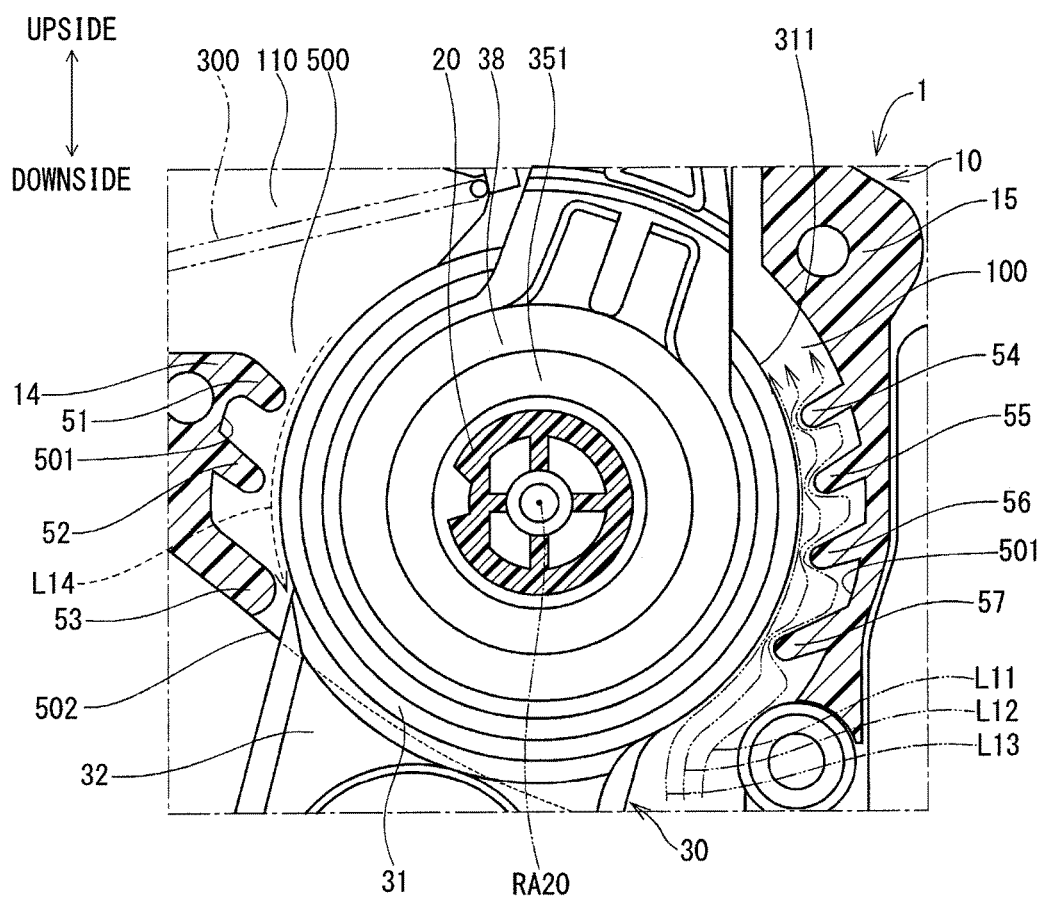
FIG. 5 is a schematic diagram for describing a flow of air at the acceleration device of the first embodiment of the present disclosure.

Next, the advantages of the acceleration device 1 will be described with reference to FIG. 5. In FIG. 5, a flow of the air, which enters the receiving space 110 from the outside, is schematically indicated by dot-dot-dash lines L11, L12, L13 at the gap 100 between the back portion 15 and the pedal boss portion 31, and a flow of foreign objects, which is outputted from the receiving space 110 to the outside, is indicated by a dotted line L14 at a gap between the front portion 14 and the pedal boss portion 31. However, the flow of the air and the flow of the foreign objects indicated in FIG. 5 are for the convenience of explanation, and the flow of the air and the flow of the foreign objects, which pass through the gap 100, occur in any of the gap 100 at the front portion 14 side and the gap 100 at the back portion 15 side.

In the accelerator device 1, the size of the gap 100 relative to the flow of the air from the outside varies. Specifically, the size of the gap 100 at each of the regions, in which the projections 54, 55, 56, 57 are respectively formed, is reduced in comparison to the size of the gap 100 at each of the regions, in which the projections 54, 55, 56, 57 are not formed. In this way, the air, which passes through the gap 100, repeat contraction and expansion, as indicated by the dot-dot-dash lines L11, L12, L13 in FIG. 5, so that the air, which passes through the gap 100, is likely to be disturbed, and the flow of the air tends to stagnate. As a result, the foreign objects, which are contained in the air passing through the gap 100, are less likely to enter the receiving space 110. Therefore, it is possible to reduce the amount of foreign objects, which enter the receiving space 110.

Further, as shown by the dotted line L14 in FIG. 5, the foreign objects to be discharged to the outside from the receiving space 110 are discharged to the outside along the boss portion outer wall 311, at which the projection is absent. As a result, it is possible to easily discharge the foreign objects, which have entered the receiving space 110, to the outside.

In this way, in the acceleration device 1, the flow of the air from the outside to the receiving space 110 is disturbed by the projections 51, 52, 53, 54, 55, 56, 57, so that the amount of foreign objects entering the receiving space 110 can be reduced, while the foreign objects, which have entered the receiving space 110, can be discharged to the outside along the boss portion outer wall 311, at which the projection is not formed. Thereby, the amount of foreign objects in the receiving space 110 can be reduced.

In the acceleration device 1, the projections 51, 52, 53, 54, 55, 56, 57 are formed such that the projections 51, 52, 53, 54, 55, 56, 57 project toward the outside opening 502. As a result, the flow of the air, which passes through the gap 100, can be further disturbed, so that the amount of foreign objects, which enter the receiving space 110, can be further reduced.

The projections 51, 52, 53, 54, 55, 56, 57 are provided in the acceleration device 1. As a result, the foreign objects, which have entered the gap 100 even upon disturbing of the air with the projections 53, 57 placed closest to the outside opening 502, can be further limited because of the disturbance of the air with the next projections 52, 56 and the subsequent projections 53, 55, 54. Thus, the amount of foreign objects, which enter the receiving space 110, can be further reduced.

Further, the projections 51, 52, 53, 54, 55, 56, 57 are formed such that distances from the radially inner end surfaces 511, 521, 531, 541, 551, 561, 571 of the projections 51, 52, 53, 54, 55, 56, 57 to the boss portion outer wall 311 are equal to each other. As a result, while disturbing the flow of the air from the outside to some extent, the foreign objects in the receiving space 110 can be relatively easily discharged to the outside.

Second Embodiment

Figure 6:
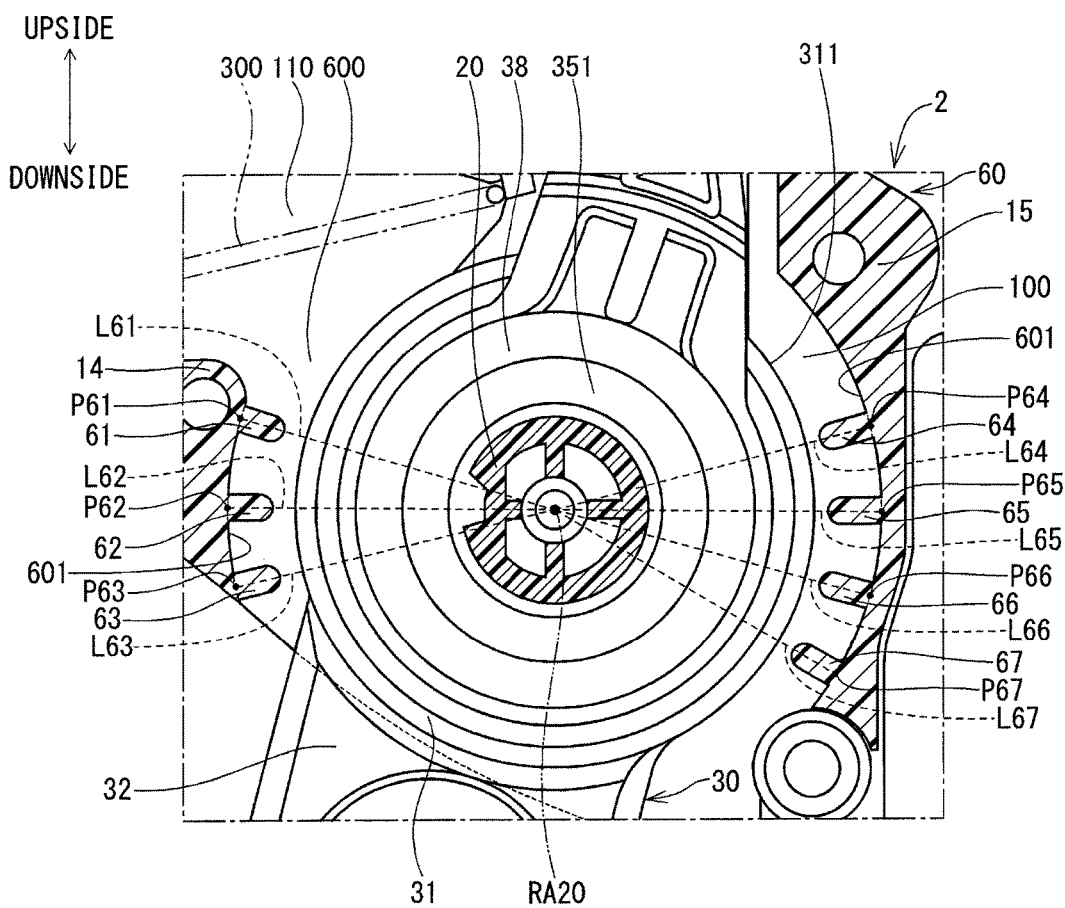
FIG. 6 is a partial enlarged view of an acceleration device according to a second embodiment of the present disclosure.

Next, an acceleration device of a second embodiment of the present disclosure will be described with reference to FIG. 6. The second embodiment differs from the first embodiment with respect to the shapes of the projections. Portions, which are substantially the same as those of the first embodiment, will be indicted by the same reference signs and will not be described redundantly. An upper side of FIG. 6 will be described as an upside, and a lower side of FIG. 6 will be described as a downside.

The acceleration device 2 of the second embodiment includes the support portion 60, the shaft 20, the operating portion 30, the pedal spring 300, the rotational angle sensor 25 and the hysteresis mechanism 35.

The support portion 60 includes a communication passage 600 at the downside of the support portion 60. The communication passage 600 communicates between the receiving space 110 and the outside of the support portion 60. The pedal boss portion 31 is rotatably received in the communication passage 600. Seven projections 61, 62, 63, 64, 65, 66, 67 are formed at a communication passage inner wall 601 of the support portion 60, which forms the communication passage 600.

Among the projections 61, 62, 63, 64, 65, 66, 67, the projections 61, 62, 63 are formed at the communication passage inner wall 601 of the front portion 14. The projections 61, 62, 63 are formed such that a certain amount of gap is formed between each adjacent two of the projections 61, 62, 63. The projections 61, 62, 63 extend in the radially inward direction and project from the communication passage inner wall 601 toward the rotational axis RA20. Specifically, each of the projections 61, 62, 63 is formed such that the projection 61, 62, 63 extends along a corresponding imaginary line L61, L62, L63 that connects between a point along the rotational axis RA20 and a corresponding point P61, P62, P63 of the communication passage inner wall 601, at which the projection 61, 62, 63 is formed.

Among the seven projections 61, 62, 63, 64, 65, 66, 67, the projections 64, 65, 66, 67 are formed at the communication passage inner wall 601 of the back portion 15. The projections 64, 65, 66, 67 are formed such that a certain amount of gap is formed between each adjacent two of the projections 64, 65, 66, 67. The projections 64, 65, 66, 67 extend in the radially inward direction and project from the communication passage inner wall 601 toward the rotational axis RA20. Specifically, each of the projections 64, 65, 66, 67 is formed such that each of the projections 64, 65, 66, 67 extends along a corresponding imaginary line L64, L65, L66, L67 that connects between the point along the rotational axis RA20 and a corresponding point P64, P65, P66, P67 of the communication passage inner wall 601, at which the projection 64, 65, 66, 67 is formed.

In the acceleration device 2, the projections 61, 62, 63, 64, 65, 66, 67 are formed such that the projections 61, 62, 63, 64, 65, 66, 67 project from the communication passage inner wall 601 in the radially inward direction. In this way, the second embodiment provides the advantages that are the same as those of the first embodiment.

Furthermore, in the acceleration device 2, the projections 61, 62, 63, 64, 65, 66, 67 are formed such that the projections 61, 62, 63, 64, 65, 66, 67 project from the communication passage inner wall 601 toward the rotational axis RA20. Thereby, molding of the projections 61, 62, 63, 64, 65, 66, 67 is eased in comparison to the first embodiment, so that the manufacturing costs of the acceleration device 2 can be reduced.

Third Embodiment

Next, an acceleration device of a third embodiment of the present disclosure will be described with reference to FIG. 7. The third embodiment differs from the first embodiment with respect to the shapes of the projections. Portions, which are substantially the same as those of the first embodiment, will be indicted by the same reference signs and will not be described redundantly. An upper side of FIG. 7 will be described as an upside, and a lower side of FIG. 7 will be described as a downside.

The acceleration device 3 of the third embodiment includes the support portion 10, the shaft 20, the operating portion 30, the pedal spring 300, the rotational angle sensor 25 and the hysteresis mechanism 35.

Figure 7:
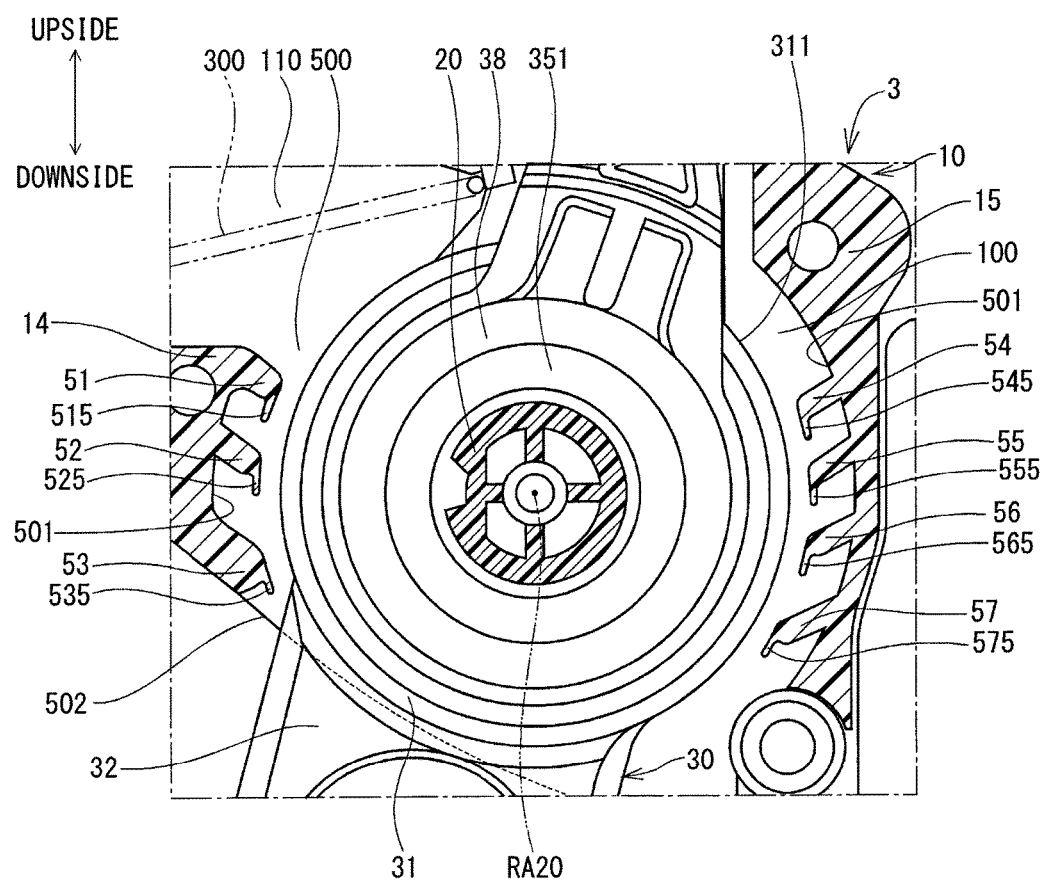
FIG. 7 is a partial enlarged view of an acceleration device according to a third embodiment of the present disclosure.

As shown in FIG. 7, seven projections 51, 52, 53, 54, 55, 56, 57, which are formed at the support portion 10, include distal end parts 515, 525, 535, 545, 555, 565, 575, respectively.

Each of the distal end parts 515, 525, 535, 545, 555, 565, 575 is formed such that the distal end part 515, 525, 535, 545, 555, 565, 575 projects from a radially inner side of the projection 51, 52, 53, 54, 55, 56, 57 toward the outside opening 502.

In the acceleration device 3, the distal end part 515, 525, 535, 545, 555, 565, 575, which is formed at the radially inner side of the projection 51, 52, 53, 54, 55, 56, 57, projects toward the outside opening 502. As a result, the flow of the air, which passes through the gap 100, is further disturbed with the distal end parts 515, 525, 535, 545, 555, 565, 575, so that the foreign objects contained in the air are less likely to enter the receiving space 110. In contrast, the foreign objects, which have entered the receiving space 110, can be easily discharged to the outside along the boss portion outer wall 311, at which the projection is absent. Thus, the third embodiment provides the advantages that are the same as those of the first embodiment.

Fourth Embodiment

Figure 8:
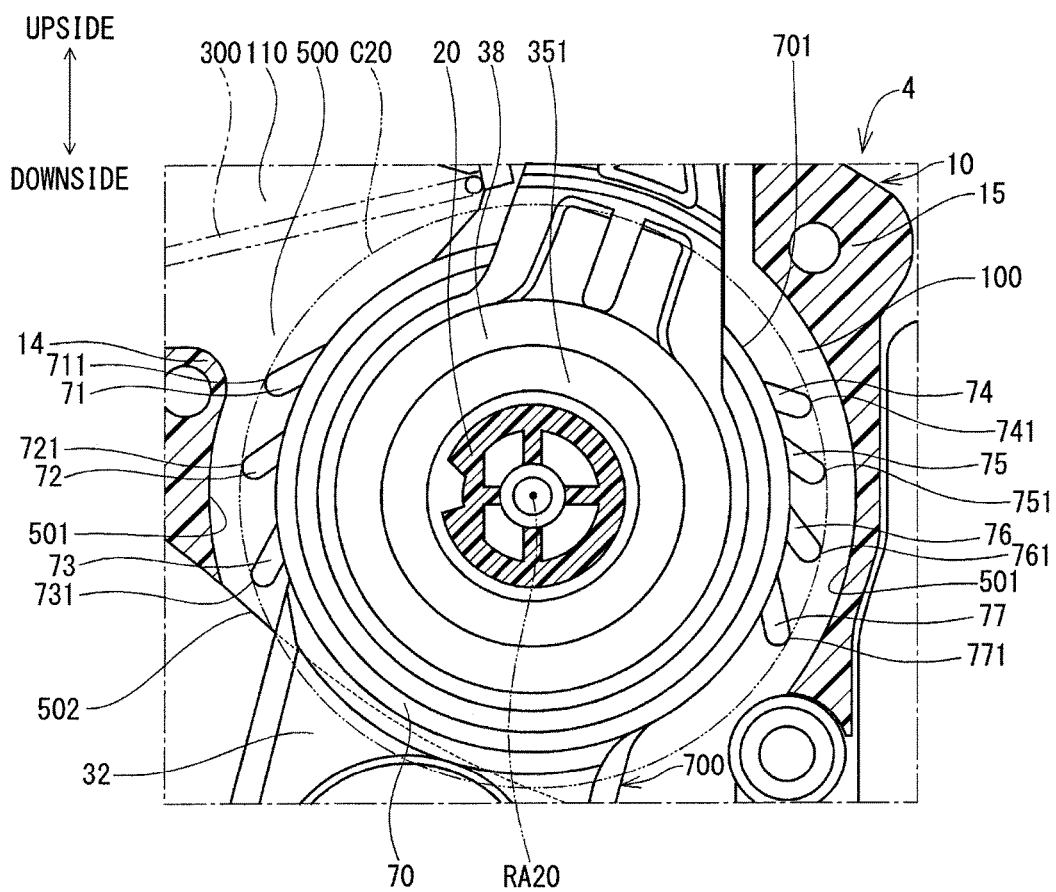
FIG. 8 is a partial enlarged view of an acceleration device according to a fourth embodiment of the present disclosure.

Next, an acceleration device of a fourth embodiment of the present disclosure will be described with reference to FIG. 8. The fourth embodiment differs from the first embodiment with respect to the locations of the projections. Portions, which are substantially the same as those of the first embodiment, will be indicted by the same reference signs and will not be described redundantly. An upper side of FIG. 8 will be described as an upside, and a lower side of FIG. 8 will be described as a downside.

The acceleration device 4 of the fourth embodiment includes the support portion 10, the shaft 20, the operating portion 700, the pedal spring 300, the rotational angle sensor 25 and the hysteresis mechanism 35.

The operating portion 700 includes the accelerator pedal 23, the pedal arm 24, the pedal boss portion (serving as the boss portion) 70, the arm connecting portion 32, the pedal spring receiving portion 33 and the full closing stopper 34. The pedal boss portion 70, the arm connecting portion 32, the pedal spring receiving portion 33 and the full closing stopper 34 are integrally formed in one piece from resin.

The pedal boss portion 70, which is shaped into a ring form, is formed between the bearing portion 13 and the second cover 18 and is fixed to the radially outer wall of the shaft 20 located at the radially outer side of the shaft 20 by, for example, press fitting. The pedal boss portion 70 is rotatably received in the communication passage 500. Thereby, the gap 100 is formed between the boss portion outer wall 701 of the pedal boss portion 70, which is located at the radially outer side of the pedal boss portion 70, and the communication passage inner wall 501.

The primary bevel gear teeth (not shown) are arranged one after another at equal intervals in the circumferential direction at the side surface of the pedal boss portion 70, which is located on the second cover 18 side. An amount of projection of each primary bevel gear tooth toward the hysteresis rotatable member 38 of the hysteresis mechanism 35 is progressively increased in the accelerator closing direction in the circumferential direction, and a tilt surface is formed at a distal end part of the primary bevel gear tooth such that the tilt surface progressively gets closer to the hysteresis rotatable member 38 in the accelerator closing direction.

A plurality of projections is formed at the boss portion outer wall 701. In the fourth embodiment, the number of projections is seven.

Among the seven projections 71, 72, 73, 74, 75, 76, 77, the projections 71, 72, 73 are formed at the front portion 14 side of the boss portion outer wall 701 such that a certain amount of gap is formed between each adjacent two of the projections 71, 72, 73 that are arranged one after another from the upside. The projections 71, 72, 73 extend in the radially outward direction and project from the boss portion outer wall 701 toward the outside opening 502.

Among the seven projections 71, 72, 73, 74, 75, 76, 77, the projections 74, 75, 76, 77 are formed at the back portion 15 side of the boss portion outer wall 701 such that a certain amount of gap is formed between each adjacent two of the projections 74, 75, 76, 77 that are arranged one after another from the upside. The projections 74, 75, 76, 77 extend in the radially outward direction and project from the boss portion outer wall 701 toward the outside opening 502.

A radially outer end surface 711, 721, 731, 741, 751, 761, 771 of each of the projections 71, 72, 73, 74, 75, 76, 77 is placed along the imaginary circle C20 that is centered at the point along the rotational axis RA20. That is, the projections 71, 72, 73, 74, 75, 76, 77 are formed such that distances from the radially outer end surfaces 711, 721, 731, 741, 751, 761, 771 of the projections 71, 72, 73, 74, 75, 76, 77 to the communication passage inner wall 501 are equal to each other.

In the acceleration device 4, the projections 71, 72, 73, 74, 75, 76, 77 are formed such that the projections 71, 72, 73, 74, 75, 76, 77 project from the boss portion outer wall 701 into the gap 100. As a result, the flow of the air, which passes through the gap 100, is apt to stagnate, and thereby the foreign objects contained in the air do not easily enter the receiving space 110. In contrast, the foreign objects, which have entered the receiving space 110, can be easily discharged to the outside along the communication passage inner wall 501, at which the projection is absent. Thus, the fourth embodiment provides the advantages that are the same as those of the first embodiment.

Fifth Embodiment

Figure 9:
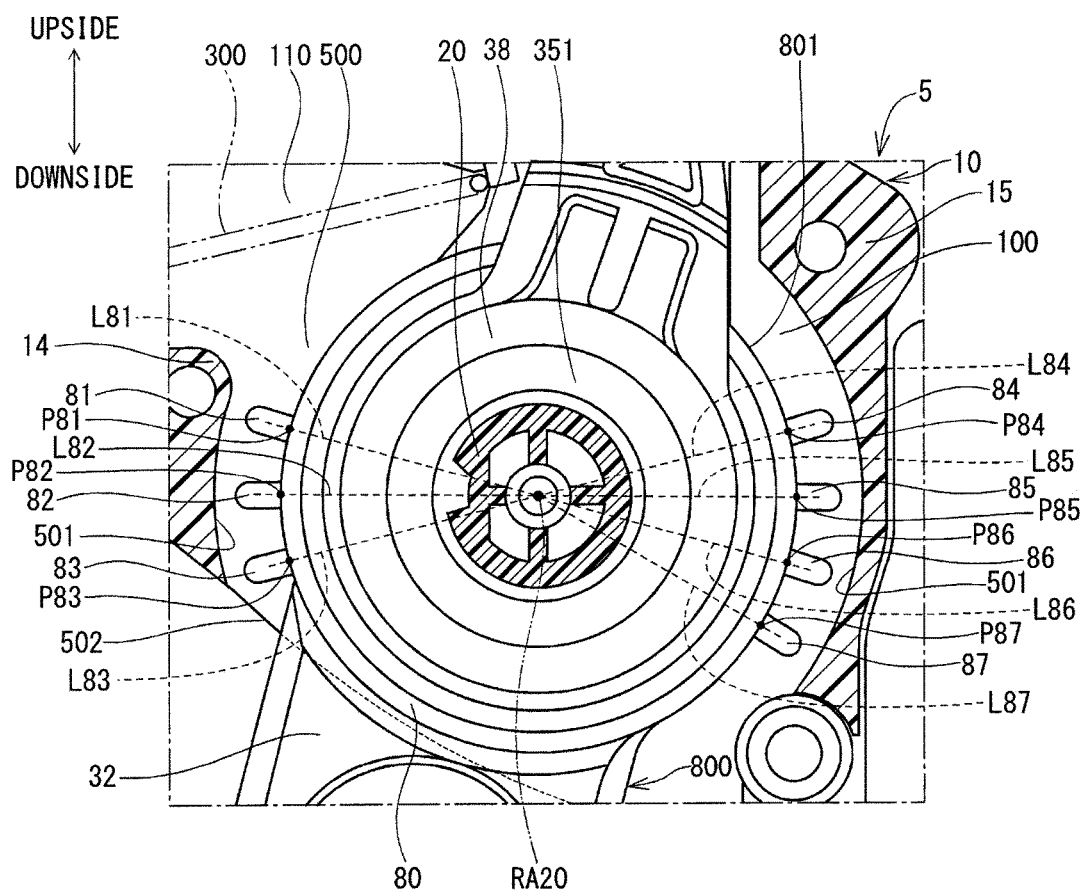
FIG. 9 is a partial enlarged view of an acceleration device according to a fifth embodiment of the present disclosure.

Next, an acceleration device of a fifth embodiment of the present disclosure will be described with reference to FIG. 9. The fifth embodiment differs from the fourth embodiment with respect to the shapes of the projections. Portions, which are substantially the same as those of the fourth embodiment, will be indicted by the same reference signs and will not be described redundantly. An upper side of FIG. 9 will be described as an upside, and a lower side of FIG. 9 will be described as a downside.

The acceleration device 4 of the fifth embodiment includes the support portion 10, the shaft 20, the operating portion 800, the pedal spring 300, the rotational angle sensor 25 and the hysteresis mechanism 35.

The operating portion 800 includes the accelerator pedal 23, the pedal arm 24, the pedal boss portion (serving as the boss portion) 80, the arm connecting portion 32, the pedal spring receiving portion 33 and the full closing stopper 34. The pedal boss portion 80, the arm connecting portion 32, the pedal spring receiving portion 33 and the full closing stopper 34 are integrally formed in one piece from resin.

The pedal boss portion 80, which is shaped into a ring form, is formed between the bearing portion 13 and the second cover 18 and is fixed to the radially outer wall of the shaft 20 located at the radially outer side of the shaft 20 by, for example, press fitting. The pedal boss portion 80 is rotatably received in the communication passage 500. Thereby, the gap 100 is formed between the boss portion outer wall 801 of the pedal boss portion 80, which is located at the radially outer side of the pedal boss portion 80, and the communication passage inner wall 501.

The primary bevel gear teeth (not shown) are arranged one after another at equal intervals in the circumferential direction at the side surface of the pedal boss portion 80, which is located on the second cover 18 side. The amount of projection of each primary bevel gear tooth toward the hysteresis rotatable member 38 of the hysteresis mechanism 35 is progressively increased in the accelerator closing direction in the circumferential direction, and a tilt surface is formed at a distal end part of the primary bevel gear tooth such that the tilt surface progressively gets closer to the hysteresis rotatable member 38 in the accelerator closing direction.

A plurality of projections is formed at the boss portion outer wall 801. In the fifth embodiment, the number of projections is seven.

Among the seven projections 81, 82, 83, 84, 85, 86, 87, the projections 81, 82, 83 are formed at the front portion 14 side of the boss portion outer wall 801 such that a certain amount of gap is formed between each adjacent two of the projections 81, 82, 83 that are arranged one after another from the upside. The projections 81, 82, 83 extend in the radially outward direction. Specifically, each of the projections 81, 82, 83 is formed such that the projection 81, 82, 83 extends along a corresponding imaginary line L81, L82, L83 that connects between the point along the rotational axis RA20 and a corresponding point P81, P82, P83 of the boss portion outer wall 801, at which the projection 81, 82, 83 is formed.

Among the seven projections 81, 82, 83, 84, 85, 86, 87, the projections 84, 85, 86, 87 are formed at the back portion 15 side of the boss portion outer wall 801 such that a certain amount of gap is formed between each adjacent two of the projections 84, 85, 86, 87 that are arranged one after another from the upside. The projections 84, 85, 86, 87 extend in the radially outward direction. Specifically, each of the projections 84, 85, 86, 87 is formed such that the projection 84, 85, 86, 87 extends along a corresponding imaginary line L84, L85, L86, L87 that connects between the point along the rotational axis RA20 and a corresponding point P84, P85, P86, P87 of the boss portion outer wall 801, at which the projection 84, 85, 86, 87 is formed.

In the acceleration device 5, the projections 81, 82, 83, 84, 85, 86, 87 are formed such that the projections 81, 82, 83, 84, 85, 86, 87 project from the boss portion outer wall 801 into the gap 100. In this way, the fifth embodiment provides the advantages that are the same as those of the first embodiment.

Furthermore, in the acceleration device 5, the projections 81, 82, 83, 84, 85, 86, 87 are formed such that each of the projections 81, 82, 83, 84, 85, 86, 87 projects from the boss portion outer wall 801 along the corresponding imaginary line L81, L82, L83, L84, L85, L86, L87. Thereby, molding of the projections 81, 82, 83, 84, 85, 86, 87 is eased in comparison to the fourth embodiment, so that the manufacturing costs of the acceleration device 5 can be reduced.

Sixth Embodiment

Next, an acceleration device of a sixth embodiment of the present disclosure will be described with reference to FIG. 10. The sixth embodiment differs from the fourth embodiment with respect to the shapes of the projections. Portions, which are substantially the same as those of the fourth embodiment, will be indicted by the same reference signs and will not be described redundantly. An upper side of FIG. 10 will be described as an upside, and a lower side of FIG. 10 will be described as a downside.

The acceleration device 6 of the sixth embodiment includes the support portion 10, the shaft 20, the operating portion 700, the pedal spring 300, the rotational angle sensor 25 and the hysteresis mechanism 35.

Figure 10:
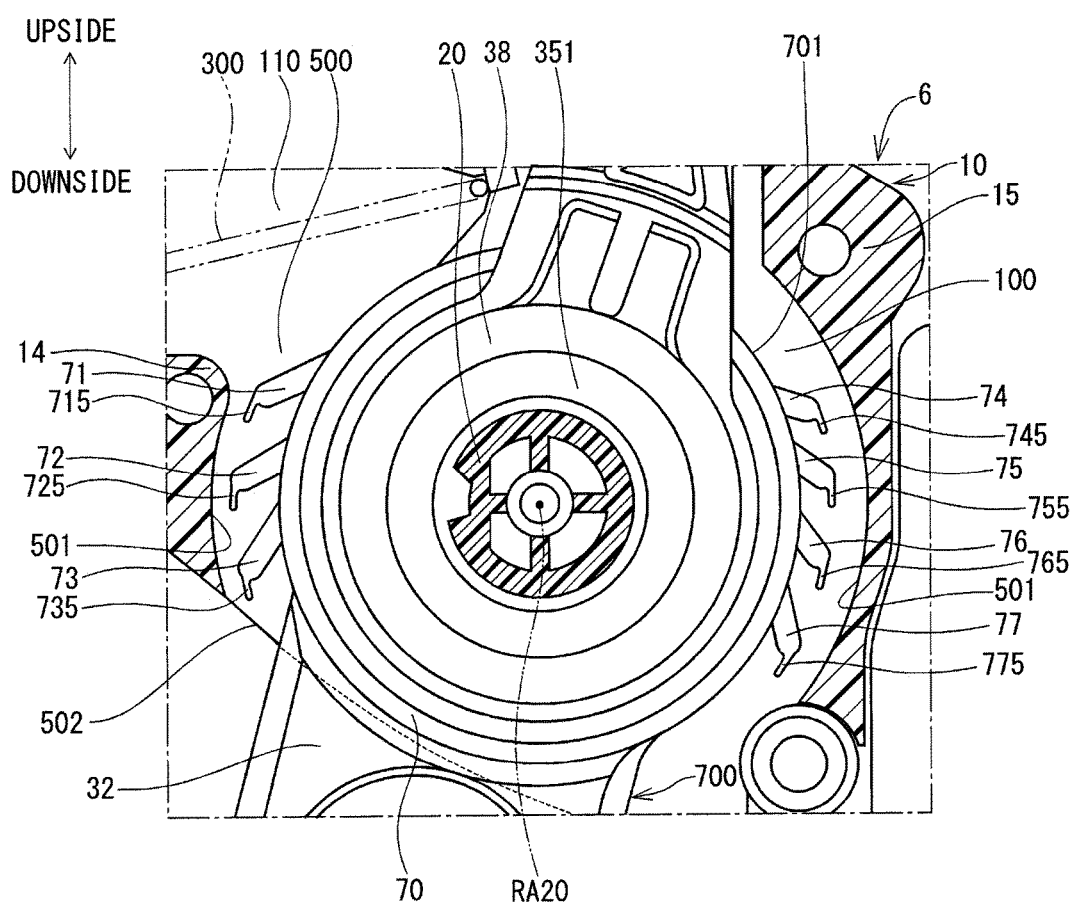
FIG. 10 is a partial enlarged view of an acceleration device according to a sixth embodiment of the present disclosure.

As shown in FIG. 10, seven projections 71, 72, 73, 74, 75, 76, 77, which are formed at the pedal boss portion 70, include distal end parts 715, 725, 735, 745, 755, 765, 775, respectively.

Each of the distal end parts 715, 725, 735, 745, 755, 765, 775 is formed such that the distal end part 715, 725, 735, 745, 755, 765, 775 projects from a radially outer side of the projection 71, 72, 73, 74, 75, 76, 77 toward the outside opening 502 of the communication passage 500.

In the acceleration device 6, the distal end part 715, 725, 735, 745, 755, 765, 775 of each of the projections 71, 72, 73, 74, 75, 76, 77 projects toward the outside opening 502 of the communication passage 500. As a result, the flow of the air, which passes through the gap 100, is further disturbed with the distal end parts 515, 525, 535, 545, 555, 565, 575, so that the foreign objects contained in the air are further less likely to enter the receiving space 110. In contrast, the foreign objects, which have entered the receiving space 110, can be easily discharged to the outside along the communication passage inner wall 501, at which the projection is absent.

Thus, the sixth embodiment provides the advantages that are the same as those of the first embodiment.

Seventh Embodiment

Figure 11:
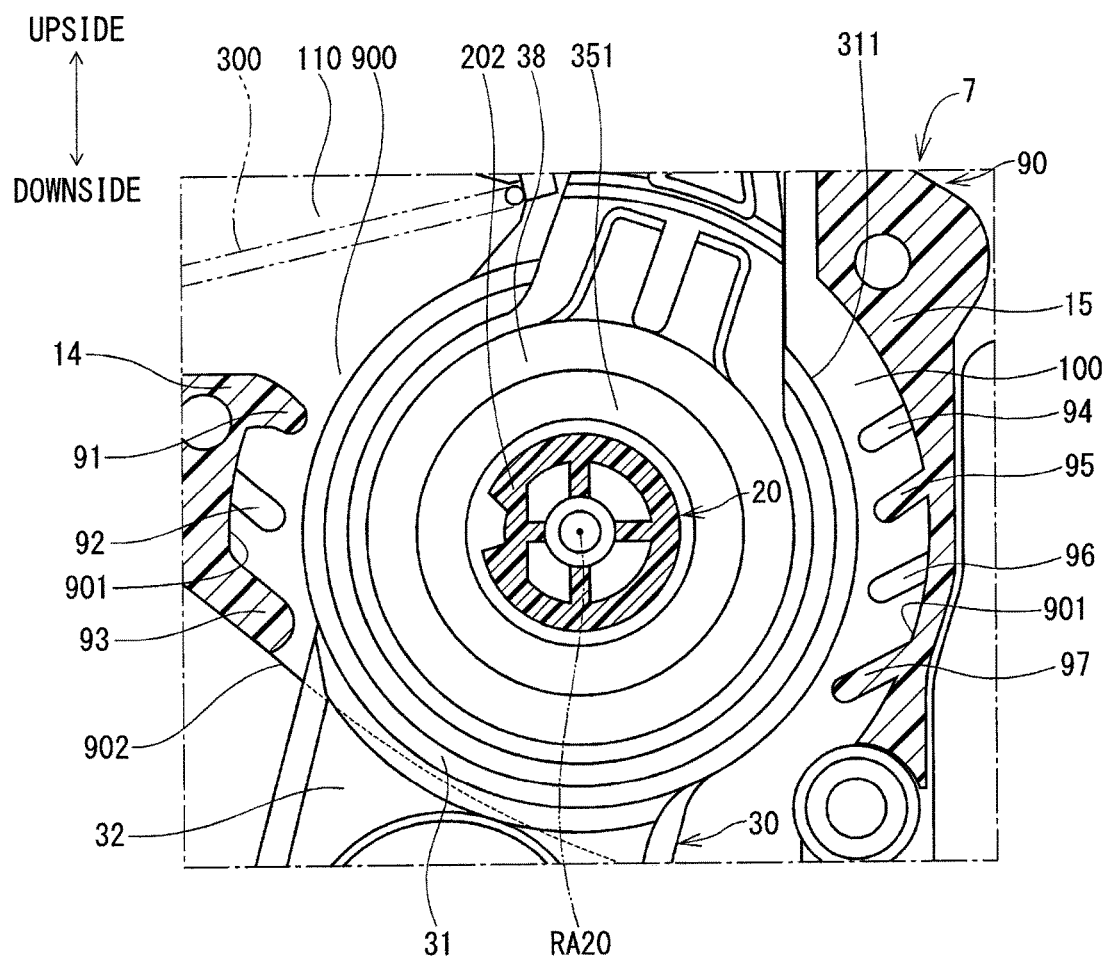
FIG. 11 is a partial enlarged view of an acceleration device according to a seventh embodiment of the present disclosure.
Figure 12:
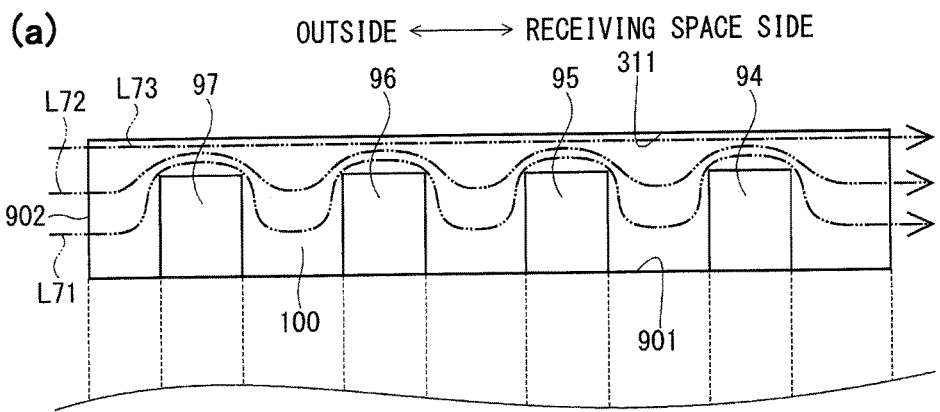
FIG. 12(a) and FIG. 12(b) are schematic diagrams for describing a flow of air at the acceleration device of the seventh embodiment of the present disclosure.
Figure 12:
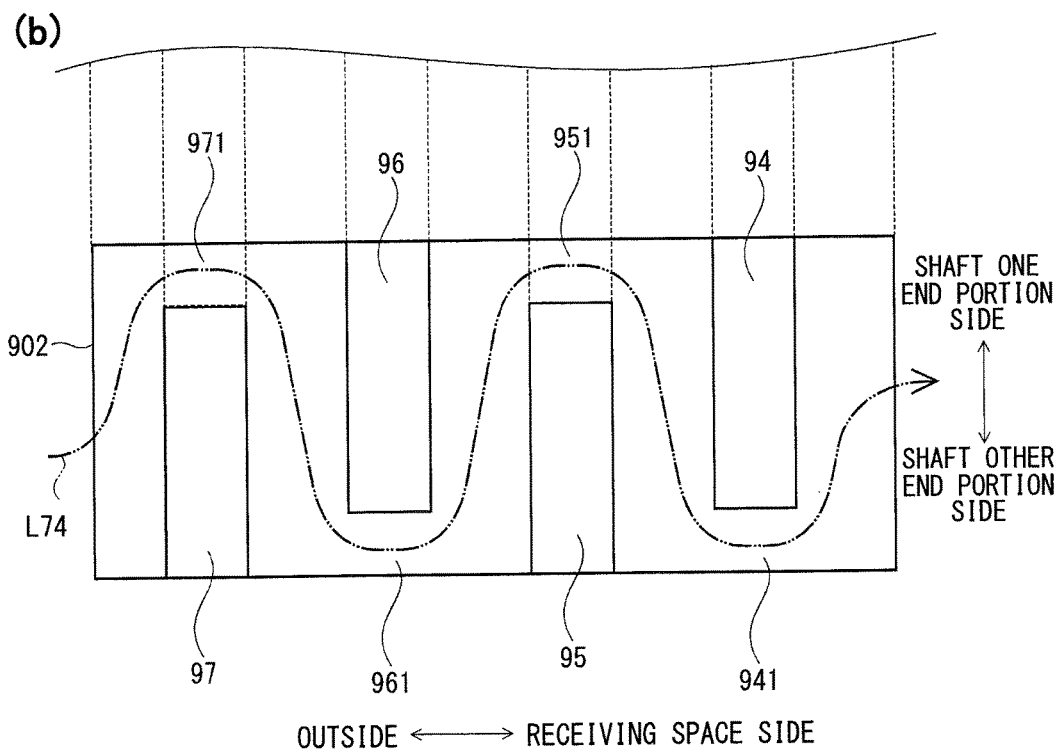

Next, the acceleration device according to a seventh embodiment of the present disclosure will be described with reference to FIGS. 11 and 12. The seventh embodiment differs from the first embodiment with respect to the shapes of the projections. Portions, which are substantially the same as those of the first embodiment, will be indicted by the same reference signs and will not be described redundantly. An upper side of FIG. 11 will be described as an upside, and a lower side of FIG. 11 will be described as a downside.

The acceleration device 7 of the seventh embodiment includes the support portion 90, the shaft 20, the operating portion 30, the pedal spring 300, the rotational angle sensor 25 and the hysteresis mechanism 35.

The support portion 90 includes a communication passage 900 at the downside of the support portion 90. The communication passage 900 communicates between the receiving space 110 and the outside of the support portion 90. The pedal boss portion 31, which is fitted to the shaft 20, is rotatably received in the communication passage 900. Seven projections 91, 92, 93, 94, 95, 96, 97 are formed at a communication passage inner wall 901 of the support portion 90, which forms the communication passage 900.

Among the seven projections 91, 92, 93, 94, 95, 96, 97, the projections 91, 92, 93 are formed at the communication passage inner wall 901 of the front portion 14 such that a certain amount of gap is formed between each adjacent two of the projections 91, 92, 93 that are arranged one after another from the upside. The projections 91, 92, 93 extend in the radially inward direction and project from the communication passage inner wall 901 toward an outside opening 902 of the communication passage 900.

The projections 91, 92, 93 are alternately arranged in the axial direction of the rotational axis RA20 of the shaft 20. Specifically, the projection 92, which serves as a one-side projection, is formed to extend from the one end portion 201 side of the shaft 20 to a location adjacent to the other end portion 202 of the shaft 20. That is, as shown in FIG. 11, an end part of the projection 92 located at the other end portion 202 side of the shaft 20 does not extend to an end surface of the housing 12 located on the side where the second cover 18 is placed. Furthermore, the projections 91, 93, each of which serves as an opposite-side projection, are formed to extend from the other end portion 202 side of the shaft 20 to a location adjacent to the one end portion 201 of the shaft 20. Specifically, an end part of the projection 92 located at the one end portion 201 side of the shaft 20 does not extend to the bearing portion 13 of the housing 12. At this time, a part of the projection 92 is overlapped with a part of each of the projections 91, 93 in a direction that is perpendicular to the rotational axis RA20.

Among the projections 91, 92, 93, 94, 95, 96, 97, the projections 94, 95, 96, 97 are formed at the communication passage inner wall 901 of the back portion 15 such that a certain amount of gap is formed between each adjacent two of the projections 94, 95, 96, 97 that are arranged one after another from the upside. The projections 94, 95, 96, 97 extend in the radially inward direction and project from the communication passage inner wall 901 toward the outside opening 902.

The projections 94, 95, 96, 97 are alternately arranged in the axial direction of the rotational axis RA20 of the shaft 20. Specifically, the projections 94, 96, each of which serves as a one-side projection, are formed to extend from the one end portion 201 side of the shaft 20 to a location adjacent to the other end portion 202 of the shaft 20. That is, as shown in FIG. 11, an end part of each of the projections 94, 96 located at the other end portion 202 side of the shaft 20 does not extend to the end surface of the housing 12 located on the side where the second cover 18 is placed. Furthermore, the projections 95, 97, each of which serves as an opposite-side projection, are formed to extend from the other end portion 202 side of the shaft 20 to a location adjacent to the one end portion 201 of the shaft 20. Specifically, an end part of the projection 92 located at the one end portion 201 side of the shaft 20 does not extend to the bearing portion 13 of the housing 12. At this time, a part of each of the projections 94, 96 is overlapped with a part of each of the projections 95, 97 in the direction that is perpendicular to the rotational axis RA20.

Here, a relationship between lengths of the projections 94, 95, 96, 97 measured in the axial direction of the rotational axis RA20 and a flow of the air passing through the gap 100 will be described with reference to FIG. 12(a) and FIG. 12(b). FIG. 12(a) and FIG. 12(b) are schematic diagrams, which indicate the gap 100 between the communication passage inner wall 901, at which the projections 94, 95, 96, 97 are formed, and the boss portion outer wall 311. FIG. 12(a) is a schematic diagram of the gap 100 taken in the axial direction of the rotational axis RA20. FIG. 12(b) is a schematic diagram of the gap 100 taken from the rotational axis RA20. In FIG. 12(a) and FIG. 12(b), in order to ease understanding of the flow of the air passing through the gap 100, the shapes of the projections 94, 95, 96, 97 are simplified and enlarged, and the gap 100 is shaped into generally a rectangular parallelepiped form. In FIG. 12(a), the flow of the air passing through the gap 100 is indicated by dot-dot-dash lines L71, L72, L73, which are arranged one after another in this order from the communication passage inner wall 901. In FIG. 12(a) and FIG. 12(b), although the flow of the air passing through the gap 100, at which the projections 94, 95, 96, 97 are formed, is indicated, the flow of the air passing through the gap 100, at which the projections 91, 92, 93 are formed, is similar to the flow of the air passing through the gap 100, at which the projections 94, 95, 96, 97 are formed.

As indicated by the dot-dot-dash lines L71, L72, L73 of FIG. 12(a), the regions, at which the projections 94, 95, 96, 97 are formed, and the regions, at which the projections 94, 95, 96, 97 are not formed, are alternately arranged, so that the air, which has enters the gap 100 from the outside opening 902, repeat contraction and expansion. Thus, the flow of the air is likely to be disturbed. Thereby, the flow of the air, which passes through the gap 100, tends to stagnate, and the foreign objects, which are contained in the air passing through the gap 100, are less likely to enter the receiving space 110.

Furthermore, in the acceleration device 7, the projections 95, 97, which form the gaps 951, 971 for conducting the air at the one end portion 201 side of the shaft 20, and the projections 94, 96, which form the gaps 941, 961 for conducting the air at the other end portion 202 side of the shaft 20, are alternately arranged. In addition, as shown in FIG. 12(b), the projections 94, 95, 96, 97 are formed such that the parts of the projections 94, 95, 96, 97 are overlapped with each other in the direction that is perpendicular to the rotational axis RA20. Thereby, the air, which has entered the gap 100 from the outside opening 902, moves back and forth between the one end portion 201 side of the shaft 20 and the other end portion 202 side of the shaft 20 during the time of passing through the gap 100, as indicated by the dot-dot-dash line L74 of FIG. 12(b).

In the acceleration device 7, the projections 91, 92, 93, 94, 95, 96, 97 are formed to project from the communication passage inner wall 901 into the gap 100. In this way, the seventh embodiment provides the advantages that are the same as those of the first embodiment.

Furthermore, in the acceleration device 7, the projections, which form the gaps for conducting the air at the one end portion 201 side of the shaft 20, and the projections, which form the gaps for conducting the air at the other end portion 202 side of the shaft 20, are alternately arranged. Also, these projections are formed such that the parts of the projections are overlapped with each other in the direction that is perpendicular to the rotational axis RA20. In this way, the air, which passes the gap 100, not only repeat the expansion and contraction in the radial direction of the pedal boss portion 31 but also move back and forth in the axial direction of the rotational axis RA20. Thereby, the flow length of the air is increased, so that the momentum of the flow of the air is weakened. Therefore, it is possible to reduce the amount of foreign objects, which are contained in the air and enter the receiving space 110.

Other Embodiments

In the above embodiments, the projections are formed to project in the direction toward the outside opening or the radial direction of the pedal boss portion. However, the projecting direction of the projections should not be limited this direction. The projections may be formed to project in a direction toward an inside opening of the communication passage.

In the third and sixth embodiments, the distal end parts of the projections are formed to project in the direction toward the outside opening. However, the projecting direction of the distal end parts should not be limited this direction.

In the above embodiments, the number of the projections is set to be seven. However, the number of the projections should not be limited to this number.

In the second, third and seventh embodiments, the projections may be formed such that the distances from the radially inner end of the projections to the boss portion outer wall are equal to each other, like in the first embodiment. Furthermore, in the fifth and sixth embodiments, the projections may be formed such that the distances from the radially outer end of the projections to the communication passage inner wall are equal to each other, like in the fourth embodiment.

In the second to sixth embodiments, the projections, which form gaps for conducting the air at the one axial side of the shaft, and the projections, which form the gaps for conducting the air at the other axial side of the shaft, may be alternately arranged, like in the seventh embodiment.

The present disclosure should not be limited to the above embodiments, and the present disclosure may be embodied in various forms without departing from the scope of the present disclosure.

The invention claimed is:

1. An acceleration device comprising:
a support portion that has a communication passage, which communicates between an inside of the support portion and an outside of the support portion, wherein the support portion is installable to a vehicle body;
a shaft that is rotatably supported by the support portion;
a boss portion that is located on a radially outer side of the shaft and is rotatable integrally with the shaft in the communication passage;
a depressible portion that is connected to the boss portion and is depressible by a driver;
a rotational angle sensing device that is operable to sense a rotational angle of the shaft relative to the support portion;
an urging portion that urges rotation of the shaft in an accelerator closing direction; and
a first plurality of projections and a second plurality of projections that are formed at only one of:
a boss portion outer wall, which is located at a radially outer side of the boss portion; or
a communication passage inner wall, which is an inner wall of the support portion that forms the communication passage and is opposed to the boss portion outer wall, wherein:
the first plurality of projections and the second plurality of projections project from the boss portion outer wall in a radially outward direction or project from the communication passage inner wall in a radially inward direction; and
in a vertical cross-section, which is perpendicular to a rotational axis of the shaft, the first plurality of projections is placed on one radial side of the rotational axis, and the second plurality of projections is placed on an opposite radial side of the rotational axis, which is opposite from the one radial side of the rotational axis.

2. The acceleration device according to claim 1, wherein the first plurality of projections and the second plurality of projections are formed to project toward an outside opening of the communication passage.

3. The acceleration device according to claim 1, wherein each of the first plurality of projections and the second plurality of projections is formed to extend in a direction of an imaginary line that connects between:
a point along the boss portion outer wall or the communication passage inner wall, in which the projection is formed; and
a point along the rotational axis of the shaft.

4. The acceleration device according to claim 1, wherein each of the first plurality of projections and the second plurality of projections includes a distal end part that is formed to project from a radially outer side or a radially inner side of the projection toward an outside opening of the communication passage.

5. The acceleration device according to claim 1, wherein distances from radially outer end surfaces of the first plurality of projections and the second plurality of projections formed at the boss portion outer wall to the communication passage inner wall or distances from radially inner end surfaces of the first plurality of projections and the second plurality of projections formed at the communication passage inner wall to the boss portion outer wall are equal to each other.

6. The acceleration device according to claim 1, wherein:
the first plurality of projections includes:
one-side projection that is formed to extend from one side of the boss portion outer wall or the communication passage inner wall, at which one end portion of the shaft is placed, to a location adjacent to another side of the boss portion outer wall or the communication passage inner wall, at which another end portion of the shaft is placed; and
an opposite-side projection that is formed to extend from the another side of the boss portion outer wall or the communication passage inner wall, at which the another end portion of the shaft is placed, to a location adjacent to the one side of the boss portion outer wall or the communication passage inner wall, at which the one end portion of the shaft is placed; and a portion of the one-side projection and a portion of the opposite-side projection are overlapped with each other in a direction that is perpendicular to the rotational axis of the shaft.

7. The acceleration device according to claim 1, wherein: the second plurality of projections includes:
   one-side projection that is formed to extend from one side of the boss portion outer wall or the communication passage inner wall, at which one end portion of the shaft is placed, to a location adjacent to another side of the boss portion outer wall or the communication passage inner wall, at which another end portion of the shaft is placed; and
   an opposite-side projection that is formed to extend from the another side of the boss portion outer wall or the communication passage inner wall, at which the another end portion of the shaft is placed, to a location adjacent to the one side of the boss portion outer wall or the communication passage inner wall, at which the one end portion of the shaft is placed; and
   a portion of the one-side projection and a portion of the opposite-side projection are overlapped with each other in a direction that is perpendicular to the rotational axis of the shaft.

8. The acceleration device according to claim 1, wherein the first plurality of projections and the second plurality of projections are formed at the communication passage inner wall and project from the communication passage inner wall in the radially inward direction.

9. An acceleration device comprising:
   a support portion that has a communication passage, which communicates between an inside of the support portion and an outside of the support portion, wherein the support portion is installable to a vehicle body;
   a shaft that is rotatably supported by the support portion;
   a boss portion that is located on a radially outer side of the shaft and is rotatable integrally with the shaft in the communication passage;
   a depressible portion that is connected to the boss portion and is depressible by a driver;
   a rotational angle sensing device that is operable to sense a rotational angle of the shaft relative to the support portion;
   an urging portion that urges rotation of the shaft in an accelerator closing direction; and
   a first plurality of projections and a second plurality of projections that are formed at only one of:
      a boss portion outer wall, which is located at a radially outer side of the boss portion; or
      a communication passage inner wall, which is an inner wall of the support portion that forms the communication passage and is opposed to the boss portion outer wall, wherein:
   the first plurality of projections and the second plurality of projections project from the boss portion outer wall in a radially outward direction or project from the communication passage inner wall in a radially inward direction;
   in a cross-section, which is perpendicular to a rotational axis of the shaft, the first plurality of projections is placed on one radial side of the rotational axis, and the second plurality of projections is placed on an opposite radial side of the rotational axis, which is opposite from the one radial side of the rotational axis; and
   the first plurality of projections overlaps with the second plurality of projections along an imaginary circle in a circumferential direction of the boss portion.

10. The acceleration device according to claim 9, wherein:
   the depressible portion is connected to the boss portion through a connecting portion;
   the first plurality of projections is circumferentially spaced from the second plurality of projections by a circumferential distance that is larger than a circumferential extent of the connecting portion; and
   the first plurality of projections is placed on one circumferential side of the connecting portion while the second plurality of projections is placed on an opposite circumferential side of the connection portion that is opposite from the one circumferential side in the circumferential direction.

11. The acceleration device according to claim 9, wherein the one radial side and the other radial side are opposite to each other in a direction that is perpendicular to a vertical direction and is also perpendicular to the rotational axis.

12. An acceleration device comprising:
   a support portion that has a communication passage, which communicates between an inside of the support portion and an outside of the support portion, wherein the support portion is installable to a vehicle body;
   a shaft that is rotatably supported by the support portion;
   a boss portion that is located on a radially outer side of the shaft and is rotatable integrally with the shaft in the communication passage;
   a depressible portion that is connected to the boss portion and is depressible by a driver;
   a rotational angle sensing device that is operable to sense a rotational angle of the shaft relative to the support portion;
   an urging portion that urges rotation of the shaft in an accelerator closing direction; and
   a first plurality of projections and a second plurality of projections that are formed integrally in one piece with only one of:
      a boss portion outer wall, which is located at a radially outer side of the boss portion; or
      a communication passage inner wall, which is an inner wall of the support portion that forms the communication passage and is opposed to the boss portion outer wall, wherein:
   the first plurality of projections and the second plurality of projections project from the boss portion outer wall in a radially outward direction or project from the communication passage inner wall in a radially inward direction.

13. The acceleration device according to claim 12, wherein the first plurality of projections and the second plurality of projections are made of resin together with the boss portion outer wall or the communication passage inner wall.

14. The acceleration device according to claim 12, wherein:
   the depressible portion is connected to the boss portion through a connecting portion;
   the first plurality of projections is circumferentially spaced from the second plurality of projections by a circumferential distance that is larger than a circumferential extent of the connecting portion; and the first plurality of projections is placed on one circumferential side of the connecting portion while the second plurality of projections is placed on an opposite circumferential side of the connection portion that is opposite from the one circumferential side in a circumferential direction of the boss portion.

15. The acceleration device according to claim 12, wherein the first plurality of projections is diametrically opposed to the second plurality of projections about a rotational axis of the shaft.

\* \* \* \* \*